United States Patent
Gunnarsson et al.

(10) Patent No.: US 10,542,509 B2
(45) Date of Patent: Jan. 21, 2020

(54) RADIO NODE AND METHOD FOR SELECTIVELY PROVIDING SYNCHRONIZATION INFORMATION FOR A DEVICE-TO-DEVICE (D2D) COMMUNICATION

(71) Applicant: Telefonaktiebolaget L M Ericsson (publ), Stockholm (SE)

(72) Inventors: Fredrik Gunnarsson, Linköping (SE); Zhenshan Zhao, Beijing (CN); Yunxi Li, Järfälla (SE); Qianxi Lu, Beijing (CN); Stefano Sorrentino, Solna (SE); Qingyu Miao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 67 days.

(21) Appl. No.: 14/428,325

(22) PCT Filed: Oct. 31, 2014

(86) PCT No.: PCT/SE2014/051291
§ 371 (c)(1),
(2) Date: Mar. 13, 2015

(87) PCT Pub. No.: WO2015/065283
PCT Pub. Date: May 7, 2015

(65) Prior Publication Data
US 2016/0345279 A1 Nov. 24, 2016

Related U.S. Application Data

(60) Provisional application No. 61/898,495, filed on Nov. 1, 2013.

(51) Int. Cl.
*H04W 56/00* (2009.01)
*H04W 8/00* (2009.01)

(52) U.S. Cl.
CPC ........ *H04W 56/002* (2013.01); *H04W 8/005* (2013.01)

(58) Field of Classification Search
None
See application file for complete search history.

(56) References Cited

U.S. PATENT DOCUMENTS

2013/0083779 A1* 4/2013 Ahn ............... H04W 72/04
370/336
2013/0288668 A1 10/2013 Pragada et al.
(Continued)

FOREIGN PATENT DOCUMENTS

CN 101473672 A 7/2009
WO 2010/035100 A1 4/2010
(Continued)

OTHER PUBLICATIONS

Ericsson, "R1-134720: Synchronization Procedures for D2D Discovery and Communication," 3rd Generation Partnership Project (3GPP), TSG RAN WG1 Meeting #74bis, Oct. 7-11, 2013, 6 pages, Guangzhou, China.
(Continued)

*Primary Examiner* — Donald L Mills
(74) *Attorney, Agent, or Firm* — Withrow & Terranova, PLLC

(57) ABSTRACT

A method performed by a radio node for selectively providing synchronization information for Device-to-Device, D2D, communications between devices in a wireless communications network is provided. The radio node receives, when the radio node is providing synchronization information an indication to stop providing synchronization information for D2D communications. The radio node determines whether to continue to provide synchronization information for D2D communications or not based on the received indication.

(Continued)

A radio node for selectively providing synchronization information for Device-to-Device, D2D, communications between devices in a wireless communications network is also provided.

36 Claims, 8 Drawing Sheets

(56) References Cited

U.S. PATENT DOCUMENTS

| | | | |
|---|---|---|---|
| 2014/0211781 A1 | 7/2014 | Kim et al. | |
| 2014/0314057 A1* | 10/2014 | Van Phan | H04W 56/0045 370/336 |
| 2014/0321452 A1 | 10/2014 | Choi et al. | |
| 2015/0078297 A1* | 3/2015 | Zheng | H04W 76/023 370/329 |
| 2015/0117375 A1* | 4/2015 | Sartori | H04W 56/001 370/329 |
| 2015/0146620 A1* | 5/2015 | Phan | H04W 76/14 370/328 |
| 2015/0282036 A1* | 10/2015 | Yi | H04L 5/001 370/332 |
| 2015/0304902 A1* | 10/2015 | Yu | H04W 36/165 455/436 |
| 2016/0173239 A1* | 6/2016 | Kim | H04L 1/1812 370/329 |
| 2016/0227496 A1* | 8/2016 | Panteleev | H04L 5/0032 |
| 2016/0249311 A1* | 8/2016 | Yu | H04W 4/005 |

FOREIGN PATENT DOCUMENTS

| | | |
|---|---|---|
| WO | 2013/083197 A1 | 6/2013 |
| WO | 2013/104084 A1 | 7/2013 |
| WO | 2014/158064 A1 | 10/2014 |

OTHER PUBLICATIONS

Author Unknown, "Technical Specification Group Services and System Aspects; Feasibility study for Proximity Services (ProSe) (Release 12)," Technical Report 22.803, Version 12.2.0, 3GPP Organizational Partners, Jun. 2013, 45 pages.
Yu, J. Y. et al., "A Survey of Clustering Schemes for Mobile Ad Hoc Networks," IEEE Communications Surveys & Tutorials, First Quarter 2005, vol. 7, No. 1, pp. 32-48.
International Search Report for PCT/SE2014/051291, dated Feb. 3, 2015, 5 pages.
Extended European Search Report for European Patent Application No. 14859271.0, dated Oct. 12, 2016, 7 pages.
Examination Report for European Patent Application No. 14859271.0, dated Apr. 18, 2018, 5 pages.
First Office Action and Search Report for Chinese Patent Application No. 201480060081.2, dated Jun. 22, 2018, 18 pages.

\* cited by examiner

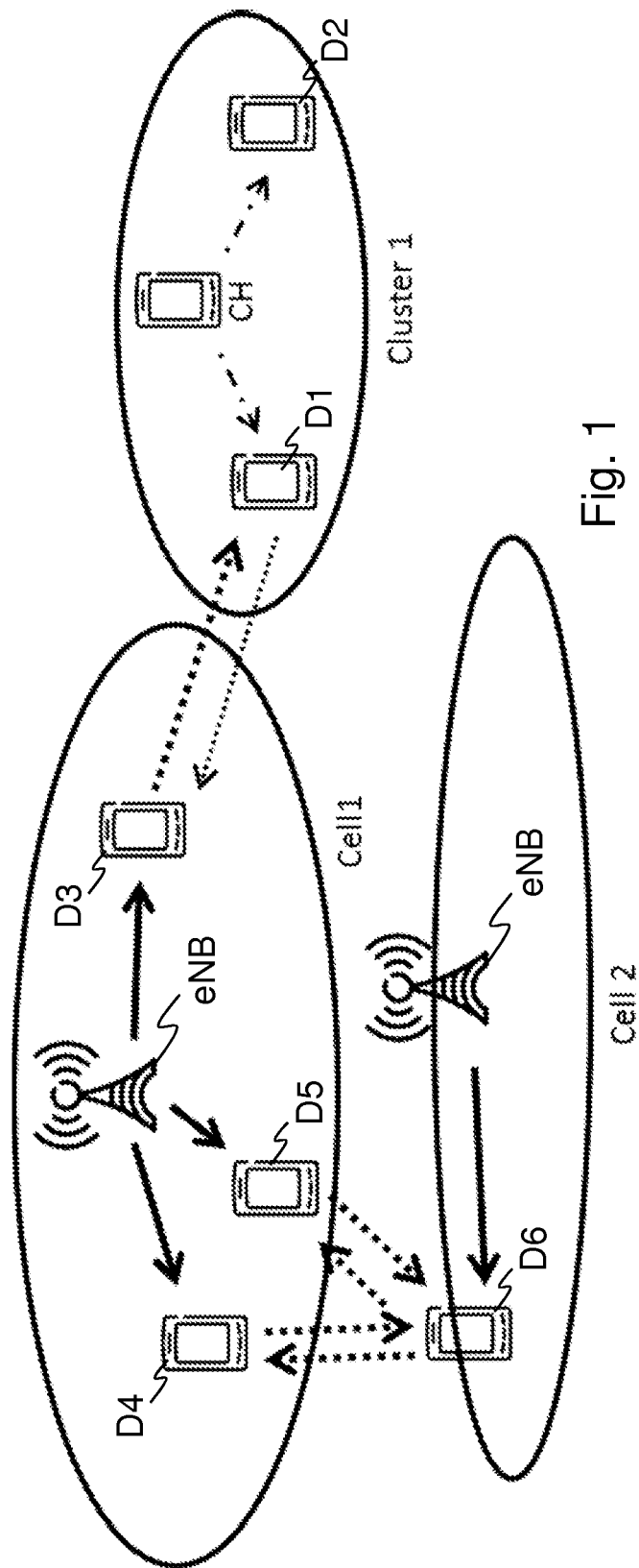
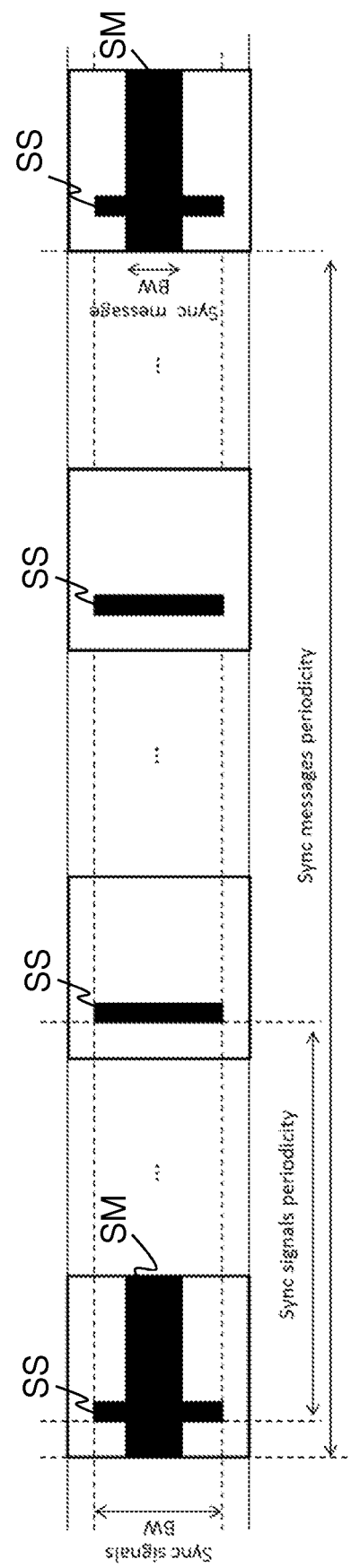
Fig. 1
Fig. 2

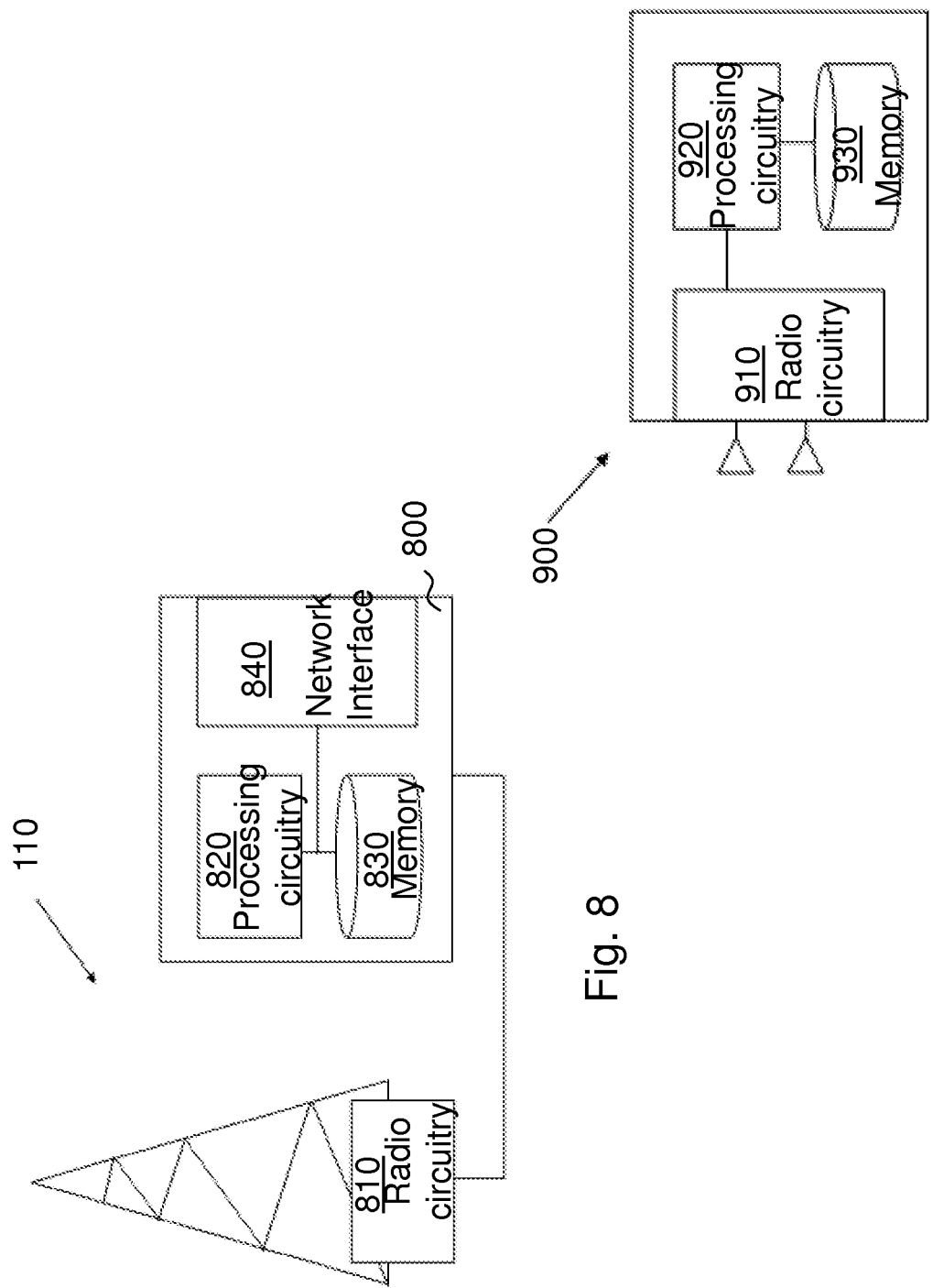

RADIO NODE AND METHOD FOR SELECTIVELY PROVIDING SYNCHRONIZATION INFORMATION FOR A DEVICE-TO-DEVICE (D2D) COMMUNICATION

This application is a 35 U.S.C. § 371 national phase filing of International Application No. PCT/SE2014/051291, filed Oct. 31, 2014, which claims priority to U.S. Provisional Application No. 61/898,495, filed Nov. 1, 2013, the disclosures of which are incorporated herein by reference in their entireties.

TECHNICAL FIELD

Embodiments herein relate to Device-to-Device (D2D) communications in a wireless communications network. In particular, embodiments herein relate to selectively providing synchronization information for D2D communication between devices.

BACKGROUND

In a typical wireless communications network, devices or wireless devices, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole wireless communications network is also broadcasted in the cell. One base station may have one or more cells. A cell may be a downlink and/or uplink cell, i.e. a cell for downlink and/or uplink communications. The base stations operate on radio frequencies to communicate over an air interface with UEs within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for communication with UEs. In a forum known as the Third Generation Partnership Project (3GPP), telecommunications suppliers propose and agree upon standards for third generation networks and UTRAN specifically, and investigate enhanced data rate and radio capacity. In some versions of the RAN such as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the radio base stations are directly connected to the EPC core network rather than connected via RNCs. In general, in E-UTRAN/LTE the functions of a RNC are distributed between the radio base stations, e.g. eNodeBs in LTE, and the core network. As such, the Radio Access Network (RAN) of an EPS has an essentially "flat" architecture comprising radio base stations that are not controlled by RNCs.

Traditional cellular communication in a wireless communications network or terrestrial radio access network is performed via radio links between devices and radio base stations, e.g. eNodeBs in an LTE system. However, when two UEs or devices are in the vicinity of each other, e.g. within a certain distance range from one another, then direct Device-to-Device, D2D, communication may be considered.

This type of communication between devices may be dependent on synchronization information from either a radio base station or a different kind of radio node e.g. a device. One example of such a different kind of radio node is a cluster head. A cluster head may, for example, be a device with dedicated capability for providing local synchronization information i.e. to act as a synchronization source or to relay synchronization information, or a device with dedicated capability enabling the device to relay synchronization information from a different synchronization source, such as another device, with capability for providing local synchronization information, or a radio base station. The radio node may be capable of relaying or providing synchronization information to at least one device.

Clustering is a well-studied research area for ad-hoc networks. For example, "SURVEY OF CLUSTERING SCHEMES FOR MOBILE AD HOC NETWORKS", IEEE Communications Surveys & Tutorials, Jane Y. Yu and Peter H. J. Chong, First Quarter 2005 provides a good overview of this field. Note, however, that the discussion here is not only about clustering in ad hoc networking, but about handling whether transmission of synchronization information from a device is activated or deactivated. The device may be out of coverage or in-coverage of other radio base stations and/or radio nodes such as devices with specific capabilities comprising means to act as a synchronization source, relay information from a radio base station or relay information from other devices.

FIG. 1 shows an example of wireless communications network in which synchronization signals for D2D communication between devices or user equipments are broadcasted by radio base stations, e.g. eNodeBs, eNBs, etc. This is shown by the fully drawn, continuous arrows in FIG. 1. Also, in the wireless communications network of FIG. 1, synchronization information (SI) or signals to enable D2D communication between some devices, D1, D2, are broadcasted by a cluster head, CH. This is shown by the dashed-dotted arrows in FIG. 1. Furthermore, in the wireless communications network of FIG. 1, synchronization information or signals for D2D communication between some devices, D3, D4, D5, D6 are also broadcasted by devices having a ProSe-capability. This is shown by the dotted arrows in FIG. 1. The 3GPP has produced a set of requirements for Proximity Service (ProSe) in Technical Report 3GPP TR 22.803. The goal is to provide local discovery and connectivity to devices in proximity of each other. The ProSe Study Item recommends also supporting D2D operation for out of network (NW) coverage devices.

Here, it may be noted that the lower-left device, D6, in cell 2 receives synchronization information from multiple ProSe capable devices. If such transmissions are performed in a certain manner, it is possible for the receiving device D6 to combine the received signals to enhance reception performance. One such scheme is referred to as a Single-Frequency Network, SFN, transmission, which enable combination of multiple identical sync signals relayed by D2D-enabled devices, D4, D5, within cell 1. Also synchronization information is relayed by devices, D1 and D3, between 'cell 1' and the 'cluster 1'. This synchronization information is in addition to the synchronization information broadcasted by respective eNB. It is also possible that the synch signals are sent via separate configurations and/or at separate time intervals. In such cases, it can still be beneficial to consider both signals, even though the signals cannot be combined. It is enough if at least one of the signals is received properly.

If the cluster head is within network coverage, it may relay the synchronization information to enable devices out-of-coverage to receive this information. The devices D3-D5 in cell 1 are examples of that.

The role of a cluster head, CH, may also be seen as a synchronization information provider to devices in the cluster head's vicinity, e.g. within cluster 1 in FIG. 1. An example of this is further described in the 3GPP standard document R1-134720 "Synchronization Procedures for D2D Discovery and Communication", where synchronization information is used for aligning a receiver window for receiving transmissions and aligning frequency correction when detecting D2D channels, and for aligning transmitter timing and parameters when transmitting D2D channels.

FIG. 2 shows an example of broadcast of synchronization information, wherein the synchronization (sync) information comprises a synchronization signal (SS) and a synchronization message (SM). These may typically be transmitted with different periodicities. The SSs are transmitted with a sync signal periodicity and the SMs are transmitted with a sync message periodicity. The SSs have a certain sync signal bandwidth and the SMs may have a different bandwidth, a sync message bandwidth. These signals and messages may also be known under other names. One example is Device to Device synchronization signal (D2DSS) for the SS, and Physical Device to Device Shared Channel (PD2DSCH) for the synchronization message.

A device that has detected a synchronization source, for example, a radio base station or a cluster head, may forward such synchronization information by acting as a relay node or synchronization source relay. However, this relay or forwarding of synchronization information from the synchronization source may not be mandatory. When several devices and/or different kinds of radio nodes within a proximity area have capability for providing synchronization information by acting as a synchronization source or synchronizations source relay, there is need for a mechanism for selecting devices for providing synchronization information in a manner that ensures good performance of the wireless communications network.

SUMMARY

It is therefore an object of embodiments herein to provide an efficient and flexible way of providing synchronization information for Device-to-Device, D2D, communications between devices in a wireless communications network.

According to a first aspect of embodiments herein, the object is achieved by a method performed by a radio node for selectively providing synchronization information for D2D communications between devices in a wireless communications network. When the radio node is providing synchronization information, the radio node receives an indication to stop providing synchronization information for D2D communications. Then, the radio node determines whether to continue to provide synchronization information for D2D communications or not based on the received indication.

According to a second aspect of embodiments herein, the object is achieved by providing a radio node for selectively providing synchronization information for D2D communications between devices in a wireless communications network. The radio node comprises processing circuitry configured to provide synchronization information for D2D communications and to receive an indication to stop providing the synchronization information. The processing circuitry is also configured to determine whether to continue to provide synchronization information for D2D communications or not based on the received indication.

By having the determination of whether to continue to provide synchronization information for D2D communications between devices or not based on a received indication, either internal or external to the radio node, a flexible and efficient way of providing synchronization information for D2D communications between devices in the wireless communications network is provided. Hence, embodiments herein handle cases when a radio node acting as e.g. a synchronization source or synchronization source relay, i.e. a synchronization reference, is not able to act as a synchronization reference for a cluster of devices anymore or another radio node is to act as a synchronization source or a synchronization source relay for the cluster in place of the radio node currently acting as the synchronization source or the synchronization source relay. This results in a more flexible solution that improves the performance of the wireless communications network. For example, it results in less signalling overhead, thereby reducing interference in the system.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 1 is a schematic block diagram illustrating an example of a wireless communications network where synchronization information is broadcast in different ways.

FIG. 2 is a schematic block diagram illustrating an example of broadcast of synchronization information.

FIG. 8 is a block diagram depicting embodiments of a network node.

FIG. 9 is a block diagram depicting embodiments of a radio node.

DETAILED DESCRIPTION

Figure 3:
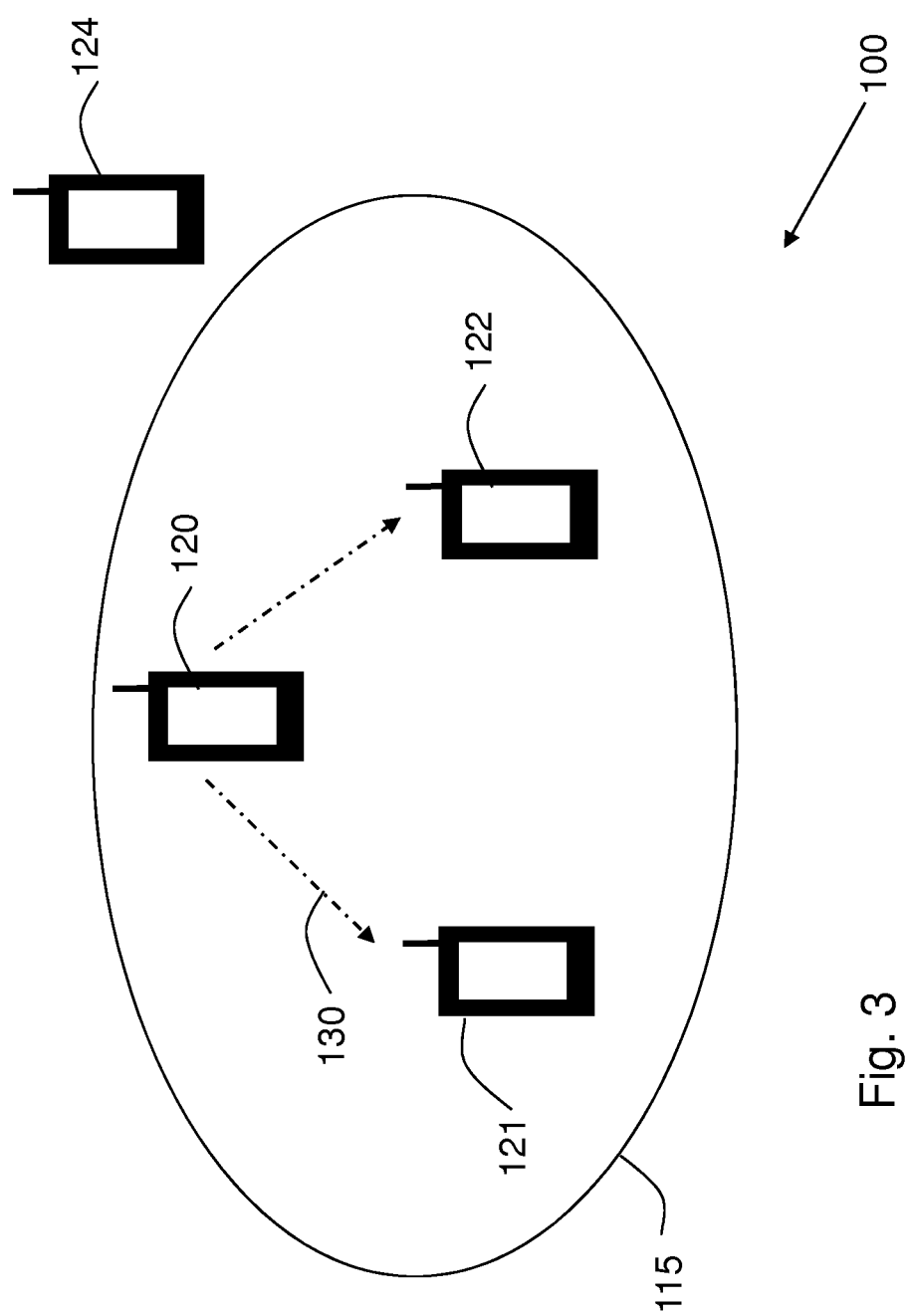
FIG. 3 is a schematic block diagram illustrating embodiments herein in a wireless communications network.

The figures are schematic and simplified for clarity, and they merely show details which are essential to the understanding of the embodiments presented herein, while other details have been left out. Throughout the disclosure, the same reference numerals are used for identical or corresponding parts or actions.

FIG. 3 depicts a cluster of devices in a wireless communications network 100 in which embodiments herein may be implemented.

Here, synchronization information 130, such as synchronisation signals and/or synchronisation messages, for D2D communication between radio nodes such as devices is provided by the device or radio node 120 to other devices, e.g. a first device 121 and a second device 122, located in its vicinity, e.g. within a coverage area 115 of the radio node 120. This is shown by the dashed-dotted arrows in FIG. 3. In other words, the radio node 120 acts a cluster head, CH, also referred to as a synchronization reference, and broadcasts the synchronization information 130 for D2D communication. The synchronization reference may be a synchronization source or a synchronization source relay.

In some scenarios, there may also be a third device 124 which may at some point request to act as a cluster head, i.e. a provider of synchronization information for D2D communications.

It should be noted that the radio node 120 may e.g. be a wireless device, a mobile terminal or a wireless terminal, a mobile phone, a computer such as a laptop, Personal Digital Assistant (PDA) or a tablet computer with wireless capability, a D2D enabled device, Machine to Machine (M2M) device or any other radio network unit capable to communicate over a radio link in a wireless communications network e.g. a network node such as a base station. The radio node 120 may also be capable of communicating with other radio nodes using wireless D2D communication over a D2D link. The devices 121,122,124 may be e.g. wireless devices, mobile terminals or wireless terminals, mobile phones, computers such as laptops, PDAs or tablet computers with wireless capability, D2D enabled devices, Machine to Machine (M2M) devices or any other radio network units capable to communicate over a radio link in a wireless communications network. The devices 121, 122, 124 may also be capable of communicating with other devices using wireless D2D communication over a D2D link.

It may be seen that a common fundamental procedure to enable different algorithms is a beacon exchange between the devices directly. This beacon exchange carries a specific 'metric', which 'metric' is based on which ones of the devices, or UEs, that can decide whether to act as a cluster head themselves, e.g., if a device has the largest metric in a proximity area, or to act as a slave of a nearby cluster head, e.g., if the metric of the device itself is smaller than the metric of the nearby neighboring device which would then be the cluster head. What is considered a proximity area and/or to be nearby may be defined by a distance range, a received power level, or similar.

This metric may be defined by or according to different capabilities. Some examples of these capabilities are: whether radio access network, RAN, coverage is available e.g. when considering a partial RAN coverage case; the different levels of maximum transmission, TX, power; the number of D2D connections the device is able to handle, etc.

The metric may be used so that the devices in the wireless communications network may have a common view on which device should be selected as the cluster head. The message exchange between devices in the cluster can either be active or passive. An active message exchange may here refer to explicit clustering control signalling between the devices, while a passive message exchange may here refer to clustering via broadcast control signalling.

When a device is about to transmit data, the device may first scan for synchronization signals broadcast from radio nodes e.g. relays or cluster heads, or radio base stations. If the device detects a synchronization signal, the data transmission from the device may be based on, aligned in time and/or frequency to, this detected synchronization signal, possibly also based on a transmission resource pool information from the cluster head or from a radio base station. If the device does not detect any synchronization signal, the device may initiate synchronization signal transmission itself and perform data transmissions according to the transmitted synchronization signal.

This means that in the case where devices are out of RAN coverage in a D2D system, one device, acting as CH, may act as synchronization source for other devices in its proximity to facilitate the D2D communication of the other devices. The other devices will then use the synchronization information, broadcast by the device acting as CH, for their D2D data communication.

In some cases, the radio node 120 acting as a synchronization source or a synchronization source relay may be triggered to stop acting as a synchronization reference anymore, for example, by receiving a deactivation request from a neighboring node, e.g. the third device 124, or by there being no data to be transmitted by the radio node 120 that acts as the synchronization source. The embodiments below show an example of a process of this deactivation of the provision of synchronization information, and how to indicate to other devices in proximity of the radio node about this deactivation.

Although various clustering algorithms are summarized in "SURVEY OF CLUSTERING SCHEMES FOR MOBILE AD HOC NETWORKS", IEEE Communications Surveys & Tutorials, Jane Y. Yu and Peter H. J. Chong, First Quarter 2005, the clustering algorithms mainly focus on the 'metric' design, and the cluster head or synchronization source (re)selection criterion design based on the 'metric', i.e., high priority nodes would deactivate the nearby low priority nodes, but there is no disclosure of any mechanism for cluster head or synchronization source deactivation when a change of synchronization source is needed.

Figure 4:
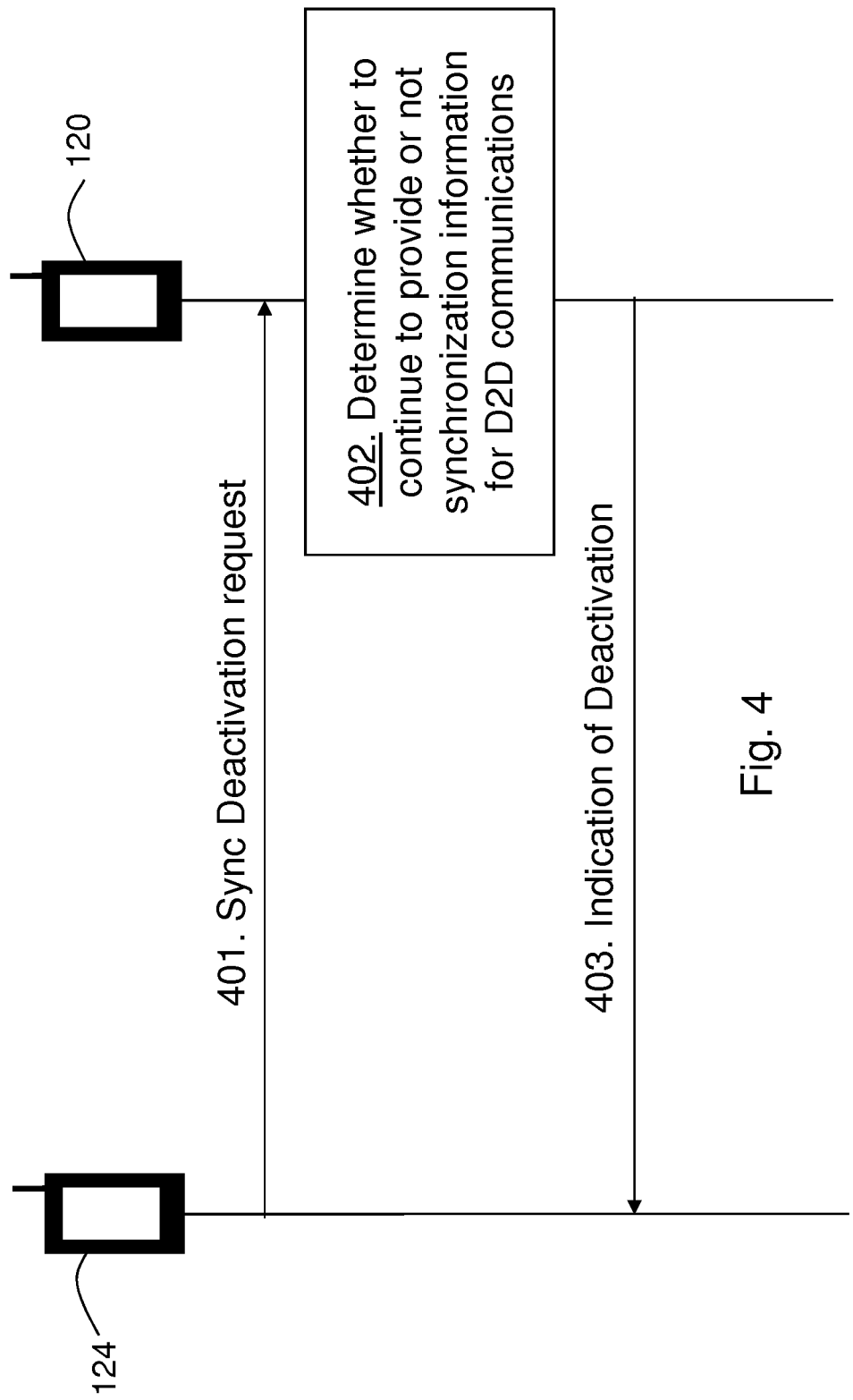
FIG. 4 is a schematic signalling diagram depicting signalling according to some embodiments herein.

Examples of embodiments of methods performed by the radio node 120 for selectively providing synchronization information for D2D communications between devices in the wireless communications network 100, will now be described with reference to a combined flowchart and signalling scheme depicted in FIG. 4. FIG. 4 is an illustrated example of actions or operations which may be taken by the radio node 120. The method may comprise the following actions.

Action 401. The third device 124, being a radio node requesting to act as a new provider of synchronisation information, transmits an indication e.g. a sync deactivation request to the radio node 120. In this action, the radio node 120 receives the indication, exemplified as the sync deactivation request, to stop providing synchronization information for D2D communications between devices.

Action 402. In this action, the radio node 120 determines whether to continue to provide synchronization information for D2D communications between devices or not based on the received indication, i.e. the sync deactivation request.

In some embodiments, this may lead to that the radio node 120 deactivates its provision of synchronisation information and/or synchronization information relaying.

In some embodiments, synchronization information transmission may be deactivated, in addition to or as an alternative to when receiving the indication, if there is no data to be transmitted by the radio node 120. In more detail, this deactivation could be triggered if a timer of the radio node 120 expires. For example, when there is no data to be transmitted by the radio node 120 the timer could be triggered. Then, when the timer expires, or a time interval set by the timer expires or has elapsed, the radio node may stop transmitting synchronization information.

In some embodiments, the deactivation of the synchronization information transmission is triggered by a neighboring radio node, such as the third device 124 as shown in FIG. 4, e.g. a neighboring radio node which has a higher priority indicator than the current synchronization information provider. In other embodiments the deactivation may be triggered due to a requirement or indication from a higher layer within the radio node 120. In the former case, the neighboring radio node may send a request message e.g. a 'sync deactivation request' as in FIG. 4, to the synchronization information providing node, i.e. the radio node 120, to deactivate the synchronization information transmission. Some examples of requirements from a higher layer may be that the radio node 120 has more important tasks to perform and/or that the radio node 120 has limited power left. Based on the request message, the radio node 120 may then decide whether to continue the synchronization information transmission for some time period, or deactivate the synchronization information transmission according to the request. For example, when the indication is received from another radio node indicating that it is capable of being a provider of synchronization information but with a lower priority than that of the radio node 120, the radio node 120 may determine to continue to provide synchronization information.

Action 403. The radio node 120 may announce or indicate to devices served by the radio node 120 that the radio node 120 will stop providing synchronization information for D2D communications during e.g. a deactivation stage. E.g. the radio node 120 may transmit a second indication indicating that the radio node 120 will no longer provide synchronization information for D2D communications. In some embodiments, the deactivation of the synchronization information transmission may be optionally announced in an announcement e.g. as part of the transmitted information. In some embodiments, a data field may be used to indicate whether the synchronization information will become deactivated within a specific time period.

In some embodiments, the announcement may be carried in discovery information to indicate the deactivation of the radio node 120 as a synchronisation source. The announcement can be encoded together with discovery information or in some specific field reserved for this announcement information. In some embodiments, the announcement may be carried in a synchronization packet which is broadcast to other radio nodes or devices in proximity, e.g. within a certain distance or able to receive transmissions, of the radio node 120. In some embodiments, the second indication or announcement may be encoded as an indication of the last synchronization information to be transmitted. It may also be announced as the k'th last synchronization information transmission in the k'th last synchronization information, where $k=1,2,\ldots,K$ and K is a pre-configured or configurable integer constant. Also, a more general sequence of k-values may be considered, for example, $k=1, k+n, k+2n, \ldots, K$. In other words the transmission of the synchronisation information may continue for a number of transmissions after making the announcement, where the number of transmissions may e.g. be selected from a sequence $n, 2n, \ldots$, where n is an integer. In some embodiments, a deactivation time period may be pre-configured or reconfigured, and optionally dependent on a priority indication. In some embodiments, the announced deactivation may be cancelled due to an indication from higher layers in the radio node 120. It should also be noted that the deactivation of the synchronization information transmission may include some interaction with the devices that follows or relies on the synchronization information.

Figure 5:
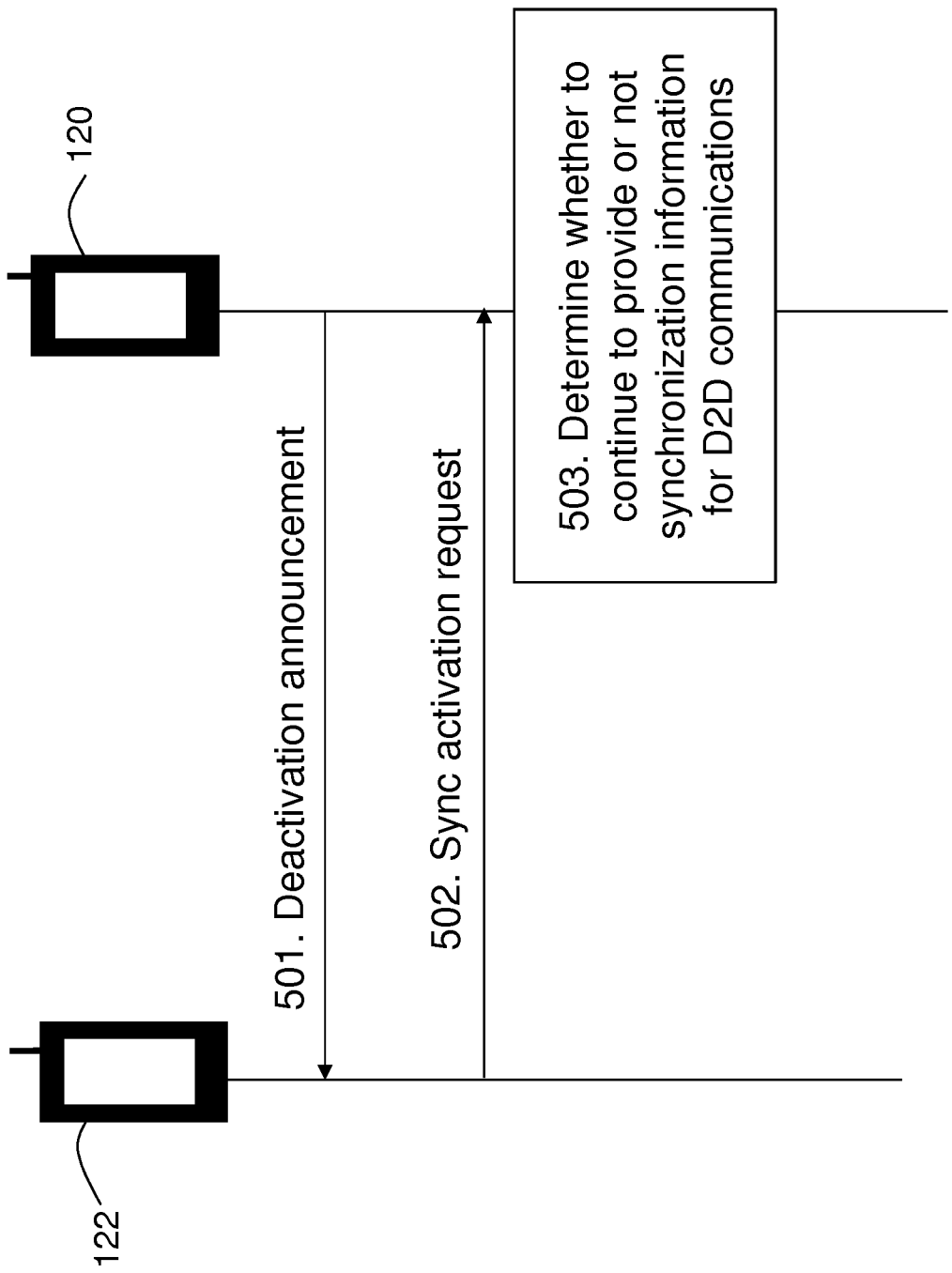
FIG. 5 is another schematic signalling diagram depicting signalling according to some embodiments herein.

Further examples of embodiments of a method performed by the radio node 120 for selectively providing synchronization information for D2D communications between devices in the wireless communications network 100, will now be described with reference to the signalling diagram depicted in FIG. 5. FIG. 5 is an illustrated example of actions or operations which may be taken by a radio node, such as, e.g. the radio node 120 or network node such as a radio base station. The method may comprise the following actions.

Action 501. In this action, the radio node 120 may transmit a second indication e.g. an announcement, to devices e.g. the second device 122, that the radio node 120 is no longer to provide synchronization information for D2D communications during e.g. a de-activation stage.

Action 502. In this action, the radio node 120 may receive a request message being a third indication. When the neighboring devices, e.g. second device 122, receive the 'deactivation announcement' in Action 501, if there are still active devices that rely on the synchronization information from the radio node 120 for their communication, the neighboring devices such as the second device 122 may respond with the request message such as a 'sync activation request' message. The neighboring devices may use this 'sync activation request' message to request the radio node providing synchronization information, i.e. the radio node 120, to continue the synchronization information transmission.

Action 503. In this action, the radio node 120, which may be about to deactivate the synchronization information transmission, may determine based on the request message in Action 502 whether or not to continue to provide the synchronization information for D2D communications for some determined time period. This means that the radio node 120 may in some situations determine to still deactivate the synchronization information transmission anyway.

Figure 6:
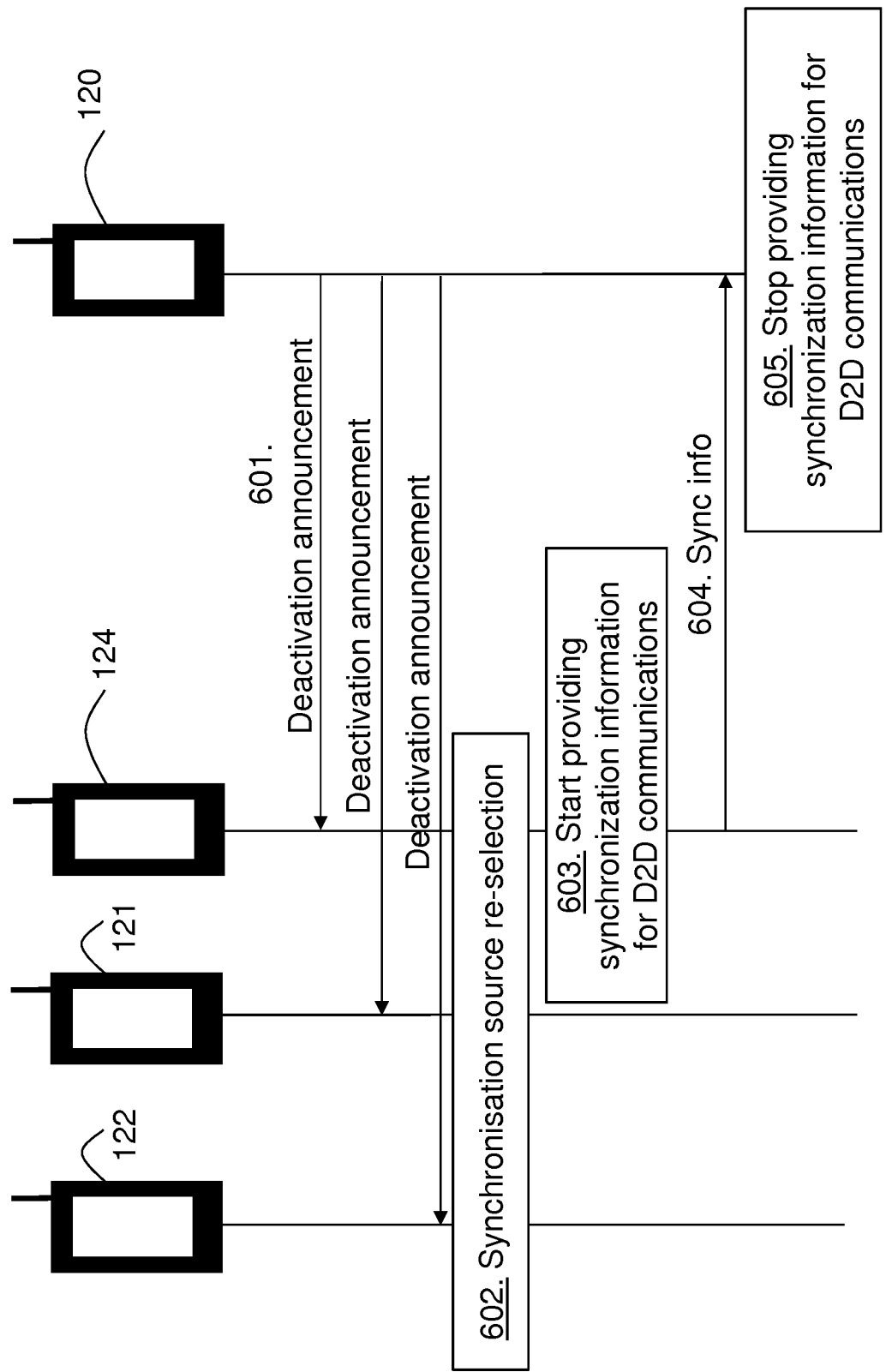
FIG. 6 is a further schematic signalling diagram depicting signalling according to some embodiments herein.

Further examples of embodiments of a method performed by the radio node 120 for selectively providing synchronization information for D2D communications between devices in the wireless communications network 100, will now be described with reference to the signalling diagram depicted in FIG. 6. FIG. 6 is an illustrated example of actions or operations which may be taken by the radio node 120, such as, e.g. a UE, device or network node such as a radio base station. The method may comprise the following actions.

Action 601. In this action, the radio node 120 may transmit a second indication, e.g. an announcement, to devices such as the first, second, and third device 121, 122, 124 that the radio node 120 is no longer to provide synchronization information for D2D communications during e.g. the de-activation stage, e.g. by broadcasting a deactivation announcement.

Action 602. The devices may perform a re-selection or selection of a synchronisation source e.g. a determination may be performed determining which radio node is to provide synchronization information. In some embodiments, when neighboring devices 121, 122, 124 receive this 'deactivation announcement', the neighboring devices 121, 122, 124 may initiate a re-selection procedure to select another synchronisation source, i.e. another radio node to act as synchronisation source, e.g. the third device 124. The new synchronisation source, i.e. the third device 124, may then eventually start transmitting synchronization information.

Action 603. The selected or determined device/radio node, illustrated as the third device 124, starts providing synchronization information for D2D communications, e.g. broadcasting the synchronization information.

Action 604. Hence, the determined synchronisation source, the third device 124, transmits synchronization information to the radio node 120. In this action, the radio node 120 receives or detects synchronization information transmitted from another node, the third device 124, acting as a new synchronisation source. The detected synchronization information may serve as the indication to the radio node 120 to stop providing synchronization information.

Action 605. In this action, the radio node 120 may stop providing/transmitting the synchronization information when having received or detected transmission of synchronization information from another node, third device 124, acting as a new synchronisation source in Action 604.

In some embodiments, if the radio node 120 does not receive the new synchronization information from the other radio node acting as new synchronisation source, such as the third device 124, the radio node 120 may derive that there is no other radio node around, or no radio node interested in acting as new synchronisation source. The radio node 120 may then stop transmitting the synchronization information as well. For example, the radio node 120 may determine that it does not receive any new synchronization information from another radio node acting as new synchronisation source after a determined or pre-determined time, e.g. when a timer expires.

Figure 7:
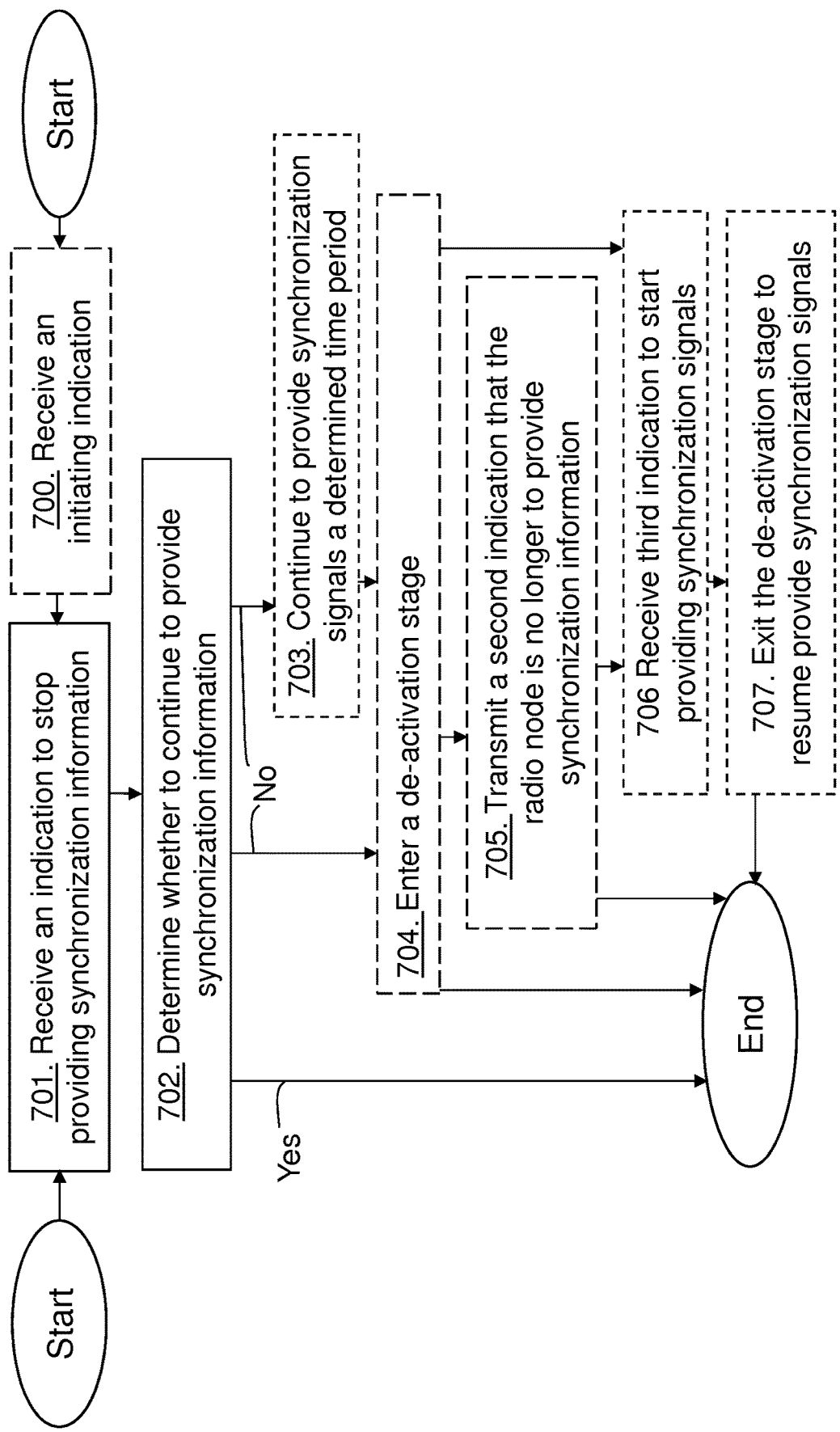
FIG. 7 is a flowchart depicting a method in a radio node according to embodiments herein

Example of embodiments of a method performed by the radio node 120 for selectively providing synchronization information for D2D communications between devices in a wireless communications network 100, is described with reference to the flowchart depicted in FIG. 7. FIG. 7 is an illustrated example of actions or operations which may be taken by the radio node 120, such as a UE or network node e.g. a radio base station. The method may comprise the actions and features described in the appended claims.

Action 700. The radio node 120 may receive from within the radio node 120 or from another radio node, an initiating or starting indication to initiate or start transmitting synchronisation information for D2D communication. The radio node 120 may receive the initiating or starting indication from within the radio node 120 and may determine to start providing synchronization information. Such an initiating or starting indication may be related to a power availability aspect, a transmission power aspect, a buffer status, a higher layer requirement, etc. For example, the indication may be triggered when data arrives in a buffer of data to be transmitted via D2D communications. Then, upon receiving the data the radio node 120 may initiate or start transmitting synchronization information for D2D communication. Hence, the radio node 120 may selectively provide synchronization information for D2D communications between devices in the wireless communications network based on the initiating or starting indication, when the radio node 120 is not providing synchronization information e.g. being in de-activation stage. The initiating or starting indication may be received from within the radio node 120 or from another radio node, which initiating or starting indication indicates a start for providing synchronization information for D2D communications. The radio node 120 may determine to start provide synchronization information for D2D communications based on the received initiating or starting indication.

Action 701. The radio node 120 receives, when the radio node is providing synchronization information, e.g. from within the radio node 120 or from another radio node, an indication to stop providing synchronization information for D2D communications. The indication to stop providing synchronization information for D2D communications may e.g. be received from within the radio node 120, e.g. via higher layer, and may be an indication that there is no data to be transmitted by the radio node 120. The indication, that there is no data to be transmitted by the radio node 120, may be provided in the radio node 120 upon expiry of a timer after elapse of a time interval. The indication to stop providing synchronization information for D2D communications may be provided by a higher communications layer in the radio node 120 in response to a requirement in the radio node 120. Alternatively or additionally, the indication to stop providing synchronization information for D2D communications may be received from another radio node in the wireless communications network, which indication may be a synchronization deactivation request. The indication to stop providing synchronization information for D2D communications may be referred to as a first indication.

Action 702. The radio node 120 determines whether or not to continue to provide synchronization information for D2D communications based on the received indication. E.g. the radio node 120 may receive synchronization information from another device, e.g. the third device 124. The radio node 120 may then retrieve a metric associated to the received synchronization information, and may determine not to continue providing synchronization information if the retrieved metric is greater than a metric associated with the radio node 120. However, if the retrieved metric is lesser than the metric associated to the radio node 120, the radio node 120 may determine to continue to provide synchronization information. The metric associated with the radio node 120 may be pre-configured. The metric may be associated with one or more of: a priority, a capability of communicating with other devices directly, a power availability aspect, a transmission power aspect, number of received synchronization sources, a buffer status, a higher layer requirement, etc. The radio node 120 may also, alternatively or additionally, receive the indication from within the radio node 120 and may determine whether or not to continue providing synchronization information. Such an indication can be related to a power availability aspect, a transmission power aspect, a buffer status, a higher layer requirement, etc.

Action 703. The indication to stop providing synchronization information for D2D communications may be received from another radio node. The radio node 120 may then continue to provide synchronization information for D2D communications for a determined or pre-determined time period after receiving the indication to stop providing synchronization information for D2D communications from the other radio node. The determined time period may be configured in the radio node 120, or re-configured in the radio node 120 based on the indication to stop providing synchronization information for D2D communications received from the other radio node. The determined time period may extend until the radio node 120 detects synchronization information for D2D communications from a further radio node which may or may not be the other radio node.

Action 704. The radio node 120, when determining not to continue providing synchronization information, may enter a de-activation stage to stop providing synchronization information for D2D communications.

Action 705. The radio node 120 may further when determining not to continue providing synchronization information, transmit a second indication to devices receiving synchronization information from the radio node that the radio node is no longer to provide synchronization information for D2D communications. The second indication may be transmitted as part of a synchronization broadcast. The second indication may be an indication of a concluding synchronization information also referred to as final or last synchronization information. The second indication may be transmitted as part of a discovery information transmission. The second indication may be comprised in a separate data field of the discovery information transmission or encoded together with discovery information of the discovery information transmission. The second indication may comprise a data field indicating a time period after which the radio node 120 will stop providing synchronization information for D2D communications.

Action 706. The radio node 120 may receive a third indication to start providing synchronization information for D2D communications. The third indication may be an indication that there is data to be transmitted by the radio node 120. The third indication may be provided by a higher communications layer in response to a requirement in the radio node 120. Alternatively or additionally, the third indication may be received from another radio node in the wireless communications network 100. The third indication, e.g. received from another radio node, may be a synchronization activation request.

Action 707. The radio node 120 may, when the third indication is received, exit the entered de-activation stage to resume providing synchronization information for D2D communications. Hence, the radio node 120 may leave the de-activation stage to resume providing synchronization information for D2D communications when determining to start providing synchronization information. This may be based on the metric mentioned in action 702.

As may be seen from the above, some embodiments describe a radio node that deactivates cluster head operation and/or synchronization information relaying and proceeds as follows.

The radio node may enter into the deactivation stage due to one or more of the following indications or reasons: A higher layer and/or data buffer communication need indication has been received, or a deactivation request(s) from neighboring node(s) has been received.

After entering into the deactivation stage, the radio node may send out a second indication e.g. an announcement to indicate the deactivation.

The radio node may quit or exit from the deactivation stage, due to one or more third indications or reasons: A higher layer and/or data buffer communication need indication has been received, or an activation request(s) from neighboring node(s) has been received.

Hence, various parts of the embodiments will relate to or concern triggers for radio node entering into the deactivation stage, radio node operations within the deactivation stage, or triggers for the radio node to leave the deactivation stage.

The details of these various parts of the embodiments are described herein and in the appended claims.

To perform the method actions for selectively providing synchronization information for D2D communications between devices in the wireless communications network 100, the radio node 120 may comprise either of the following arrangements depicted in FIG. 8-9.

The example embodiments presented herein may be utilized in the wireless communications network 100, which may further comprise a network node 110, as illustrated in FIG. 8, being an example of a radio base station 800. The wireless communications network 100 may also comprise a device 900, as illustrated in FIG. 9, being an example of the radio node 120. It should be appreciated that the examples provided in FIGS. 8 and 9 are shown merely as non-limiting examples.

According to some of the example embodiments, the device 900 may be a user equipment, D2D or M2M device, or any other wireless device or communicating device. It should be understood by the skilled in the art that "device" is a non-limiting term comprising any wireless device or node equipped with a radio interface allowing for at least one of: transmitting signals in UL and receiving data and/or measuring signals in DL. Some examples of the device 900 in its general sense are PDA, laptop, mobile, sensor, fixed relay, mobile relay, a radio network node. Some radio nodes may also be equipped with a UE-like interface, e.g., femto BS aka home eNodeBs, relays, mobile relays, or small base stations using the terminal technology. A device herein may comprise a UE (in its general sense) capable of operating or performing measurements in one or more frequencies, carrier frequencies, component carriers or frequency bands. It may be a "device" operating in single- or multi-RAT or multi-standard mode, e.g., an example dual-mode UE may operate with any one combination of WiFi and LTE or HSPA and LTE.

The network node 110 may be e.g. a radio network node such as eNodeB or core network node such as a positioning node. The radio node 120 in general may be, e.g., a user equipment, device, D2D enabled device, communication device, Internet of Things Device etc.

The example embodiments are not limited to LTE as illustrated, but may apply with any Radio Access Network (RAN), single- or multi-Radio Access Technology (RAT). Some other RAT examples are LTE-Advanced, UMTS, GSM, cdma2000, WiMAX, and WiFi. Embodiments (sections) described herein may be considered as independent embodiments or may be considered in any combination with each other to describe non-limiting examples of the example embodiments described herein.

As shown in FIG. 8, the example network node 110 may comprise processing circuitry 820, a memory 830, radio circuitry 810, and at least one antenna. The processing circuitry 820 may comprise radio frequency (RF) circuitry and baseband processing circuitry (not shown). In particular embodiments, some or all of the functionality described above as being provided by a mobile base station, a base station controller, a relay node, a NodeB, or an enhanced NodeB may be provided by the processing circuitry 820 executing instructions stored on a computer-readable medium, such as the memory 830 shown in FIG. 8. Alternative embodiments of the network node 110 may comprise additional components responsible for providing additional functionality, comprising any of the functionality identified above and/or any functionality necessary to support the example embodiments described herein.

It should also be appreciated that the processing circuitry, or any other hardware and/or software unit configured to execute operations and/or commands, of the network node 110 illustrated in FIG. 8 may be configured to provide synchronization information for D2D communications between devices in the wireless communications network as described by the various embodiments herein.

The radio circuitry 810 may be configured to transmit synchronization information and to search for and receive synchronization information from other nodes. The memory 830 may be configured to store information about associated priority indication and priority indications from detected neighboring nodes, such as, devices. The processing circuitry 820, or processing unit, may be configured to activate or deactivate transmission of synchronization information via the radio circuitry 810, or the transceiver unit, based on the associated priority indication and the set of priority indications from detected nodes, e.g. other devices or network nodes, with synchronization information.

An example of the radio node 120 may be a device 900 and is shown in FIG. 9. The example device 900 may comprise processing circuitry 920, a memory 930, radio circuitry 910, and at least one antenna. The radio circuitry 910 may comprise RF circuitry and baseband processing circuitry (not shown). In particular embodiments, some or all of the functionality described above as being provided by the radio node 120 such as a device or other form of wireless device may be provided by the processing circuitry 920 executing instructions stored on a computer-readable medium, such as the memory 930 shown in FIG. 9. Alternative embodiments of the device 900 may comprise additional components responsible for providing additional functionality, comprising any of the functionality identified above and/or any functionality necessary to support the example embodiments described herein.

The radio circuitry 910 may be configured to transmit synchronization information and to search for and receive synchronization information from other nodes. The memory 930 may be configured to store information about associated priority indication and priority indications from detected neighboring nodes, such as, devices. The processing circuitry 920, or processing unit, may be configured to activate or deactivate transmission of synchronization information via the radio circuitry 910, or the transceiver unit, based on the associated priority indication and the set of priority indications from detected nodes, e.g. other devices or network nodes, with synchronization information.

It should be appreciated that the processing circuitry 920, or any other hardware and/or software unit configured to execute operations and/or commands, of the device 900 may be configured to provide synchronization information for D2D communications between devices in a wireless communications network as described by the various embodiments herein.

Figure 10:
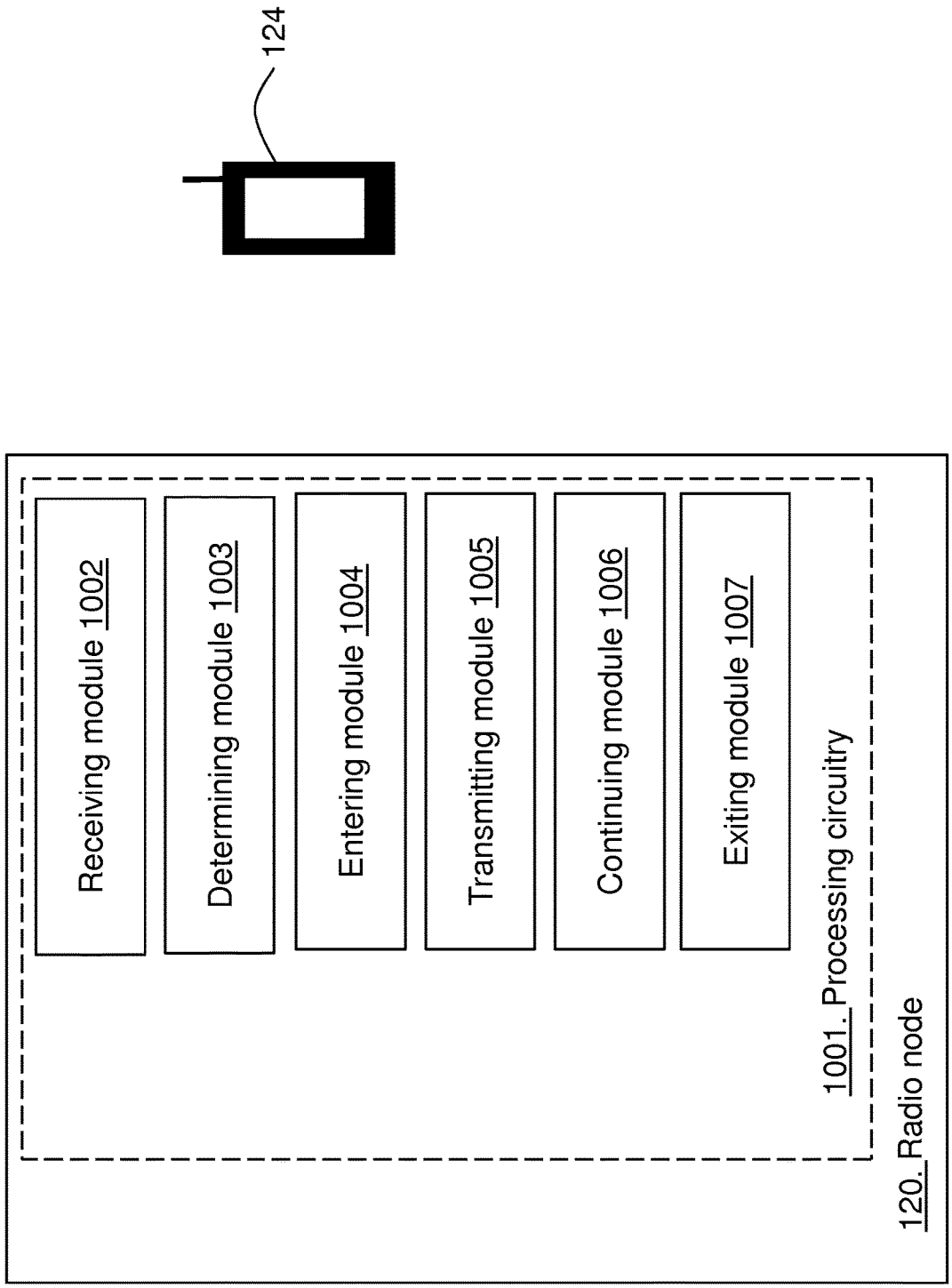
FIG. 10 is a block diagram depicting embodiments of a radio node according to embodiments herein.

FIG. 10 shows the radio node 120 for selectively providing synchronization information for D2D communications between devices in the wireless communications network 100. The radio node 120 may be a device e.g. a D2D enabled device and/or network node.

The radio node 120 comprises processing circuitry 1001 and/or a receiving module 1002 being configured to receive, e.g. from within the radio node 120 or from another radio node, an indication to stop providing synchronization information for D2D communications when the radio node 120 is providing synchronization information for D2D communications. The indication to stop providing synchronization information for D2D communications may be an indication that there is no data to be transmitted by the radio node 120. The indication that there is no data to be transmitted from the radio node may be provided in the radio node 120 upon expiry of a timer after elapse of a time interval. The indication to stop providing synchronization information for D2D communications may be provided by a higher communications layer in the radio node 120 in response to a requirement in the radio node 120. The indication, also called first indication, to stop providing synchronization information for D2D communications may be received from another radio node in the wireless communications network, which indication may be a synchronization deactivation request.

The radio node 120 may further comprise a determining module 1003, wherein the processing circuitry 1001 and/or the determining module 1003 is configured to determine whether or not to continue to provide synchronization information for D2D communications based on the received indication.

The radio node 120 may further comprise an entering module 1004, wherein the processing circuitry 1001 and/or the entering module 1004 is configured to enter a deactivation stage to stop provide synchronization information for D2D communications.

The radio node 120 may further comprise a transmitting module 1005, wherein the processing circuitry 1001 and/or the transmitting module 1005 is configured to transmit a second indication to devices receiving synchronization information from the radio node 120 that the radio node 120 is no longer to provide synchronization information for D2D communications. The processing circuitry 1001 and/or the transmitting module 1005 may further be configured to transmit the second indication to devices receiving synchronization information from the radio node as part of a synchronization broadcast. The second indication may be an indication of a concluding or final synchronization information. The second indication may be transmitted as part of a discovery information transmission. The second indication may be comprised in a separate data field of the discovery information transmission or encoded together with discovery information of the discovery information transmission. The second indication may comprise a data field indicating a time period after which the radio node 120 will stop providing synchronization information for D2D communications.

The radio node 120 may further comprise a continuing module 1006. The processing circuitry 1001 and/or the receiving module 1002 may be configured to receive the indication to stop providing synchronization information for D2D communications from another radio node, and then the processing circuitry 1001 and/or continuing module 1006 may be configured to continue to provide synchronization information for D2D communications for a determined time period after receiving the indication to stop providing synchronization information for D2D communications from the other radio node. The determined time period may be configured in the processing circuitry 1001 and/or continuing module 1006, or re-configured in the processing circuitry 1001 and/or continuing module 1006 based on the indication to stop providing synchronization information for D2D communications received from the other radio node. The processing circuitry 1001 and/or continuing module 1006 may further be configured to extend the determined time period until the processing circuitry 1001 and/or the receiving module 1002 detects synchronization information for D2D communications from a further radio node.

The radio node 120 may comprise an exiting module 1007. The processing circuitry 1001 and/or the receiving module 1002 may be configured to receive a third indication to start providing synchronization information for D2D communications. The processing circuitry 1001 and/or the exiting module 1007 may then be configured to exit the de-activation stage to resume providing synchronization information for D2D communications. The third indication may be an indication that there is data to be transmitted by the radio node 120. The third indication may be provided by a higher communications layer in response to a requirement in the radio node 120. The processing circuitry 1001 and/or the receiving module 1002 may alternatively or additionally be configured to receive the third indication from another radio node in the wireless communications network 100. The third indication received from another radio node may be a synchronization activation request.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, vehicle etc.

It should further be appreciated that the term 'device' and 'user equipment' are used interchangeably.

Although the description is mainly given for a device, it should be understood by the skilled in the art that "device" is a non-limiting term which means any wireless device or node capable of receiving in DL and transmitting in UL, e.g. PDA, laptop, mobile, sensor, fixed relay, mobile relay or even a radio base station, e.g. femto base station.

A cell is associated with a radio network node, where a radio network node or eNodeB used interchangeably in the example embodiment description, comprises in a general sense any node transmitting radio signals used for measurements or synchronization, e.g., eNodeB, macro/micro/pico base station, home eNodeB, relay, beacon device, or repeater. A radio node herein may comprise a radio node operating on one or more frequencies or frequency bands. It may be a radio node capable of carrier aggregation (CA). It may also be a single- or muti-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

It will be appreciated that the foregoing description and the accompanying drawings represent non-limiting examples of the methods and radio node taught herein. As such, the radio node and techniques taught herein are not limited by the foregoing description and accompanying drawings. Instead, the embodiments herein are limited only by the following claims and their legal equivalents.

The invention claimed is:

1. A method performed by a radio node for selectively providing synchronization information for Device-to-Device, D2D, communications between devices in a wireless communications network, the method comprising:
   receiving, when the radio node is providing synchronization information, an indication to stop providing synchronization information for D2D communications;
   determining whether to continue to provide synchronization information for D2D communications or not based on the received indication;
   responsive to determining to continue providing synchronization information, providing synchronization information for D2D communications; and
   responsive to determining not to continue providing synchronization information,
      transmitting a second indication to devices receiving synchronization information from the radio node that the radio node is no longer to provide synchronization information for D2D communications, where the second indication is transmitted as part of a discovery information transmission.

2. The method according to claim 1 further comprising when determining not to continue providing synchronization information,
   entering a de-activation stage to stop providing synchronization information for D2D communications.

3. The method according to claim 2, further comprising receiving a third indication to start providing synchronization information for D2D communications; and
when the third indication is received
exiting the entered de-activation stage to resume providing synchronization information for D2D communications.

4. The method according to claim 3, wherein the third indication is an indication that there is data to be transmitted by the radio node.

5. The method according to claim 3, wherein the third indication is provided by a higher communications layer in response to a requirement in the radio node.

6. The method according to claim 3, wherein the third indication is received from another radio node in the wireless communications network.

7. The method according to claim 6, wherein the third indication received from another radio node is a synchronization activation request.

8. The method according to claim 1, wherein the second indication is comprised in a separate data field of the discovery information transmission or encoded together with discovery information of the discovery information transmission.

9. The method according to claim 1, wherein the second indication comprises a data field indicating a time period after which the radio node will stop providing synchronization information for D2D communications.

10. The method according to claim 1, wherein the indication to stop providing synchronization information for D2D communications is an indication that there is no data to be transmitted by the radio node.

11. The method according to claim 10, wherein the indication that there is no data to be transmitted by the radio node is provided in the radio node upon expiry of a timer after elapse of a time interval.

12. The method according to claim 1, wherein the indication to stop providing synchronization information for D2D communications is provided by a higher communications layer in the radio node in response to a requirement in the radio node.

13. The method according to claim 1, wherein the indication to stop providing synchronization information for D2D communications is received from another radio node in the wireless communications network, which indication is a synchronization deactivation request.

14. The method according to claim 1, wherein the indication to stop providing synchronization information for D2D communications is received from another radio node, the method further comprising
continuing to provide synchronization information for D2D communications for a determined time period after receiving the indication to stop providing synchronization information for D2D communications from the other radio node.

15. The method according to claim 14, wherein the determined time period is configured in the radio node, or re-configured in the radio node based on the indication to stop providing synchronization information for D2D communications received from the other radio node.

16. The method according to claim 14, wherein the determined time period extends until the radio node detects synchronization information for D2D communications from a further radio node.

17. The method according to claim 1, wherein the radio node is a device or a network node.

18. A radio node for selectively providing synchronization information for Device-to-Device, D2D, communications between devices in a wireless communications network, the radio node comprising:
processing circuitry configured to receive an indication to stop providing synchronization information for D2D communications when the radio node is providing synchronization information for D2D communications, and configured to determine whether to continue to provide synchronization information for D2D communications or not based on the received indication; responsive to determining to continue providing synchronization information, providing synchronization information for D2D communications; and responsive to determining not to continue providing synchronization information:
transmitting a second indication to devices receiving synchronization information from the radio node that the radio node is no longer to provide synchronization information for D2D communications, where the second indication is transmitted as part of a discovery information transmission.

19. The radio node according to claim 18, wherein the processing circuitry is further configured to enter a de-activation stage to stop providing the synchronization information for D2D communications.

20. The radio node according to claim 19, wherein the processing circuitry is further configured to receive a third indication to start providing synchronization information for D2D communications, and to exit the de-activation stage to resume providing synchronization information for D2D communications.

21. The radio node according to claim 20, wherein the third indication is an indication that there is data to be transmitted by the radio node.

22. The radio node according to claim 20, wherein the third indication is provided by a higher communications layer in response to a requirement in the radio node.

23. The radio node according to claim 20, wherein the third indication is received from another radio node in the wireless communications network.

24. The radio node according to claim 23, wherein the third indication received from another radio node is a synchronization activation request.

25. The radio node according to claim 18, wherein the second indication to devices is comprised in a separate data field of the discovery information transmission or encoded together with discovery information of the discovery information transmission.

26. The radio node according to claim 18, wherein the second indication comprises a data field indicating a time period after which the radio node will stop providing synchronization information for D2D communications.

27. The radio node according to claim 18, wherein the indication to stop providing synchronization information for D2D communications is an indication that there is no data to be transmitted by the radio node.

28. The radio node according to claim 27, wherein the indication that there is no data to be transmitted from the radio node is provided in the radio node upon expiry of a timer after elapse of a time interval.

29. The radio node according to claim 18, wherein the indication to stop providing synchronization information for D2D communications is provided by a higher communications layer in the radio node in response to a requirement in the radio node.

30. The radio node according to claim 18, wherein the indication to stop providing synchronization information for D2D communications is received from another radio node in the wireless communications network, which indication is a synchronization deactivation request.

31. The radio node according to claim 18, wherein the processing circuitry is further configured to receive the indication to stop providing synchronization information for D2D communications from another radio node and to continue to provide synchronization information for D2D communications for a determined time period after receiving the indication to stop providing synchronization information for D2D communications from the other radio node.

32. The radio node according to claim 31, wherein the determined time period is configured in the processing circuitry, or re-configured in the processing circuitry based on the indication to stop providing synchronization information for D2D communications received from the other radio node.

33. The radio node according to claim 31, wherein the processing circuitry is further configured to extend the determined time period until the processing circuitry detects synchronization information for D2D communications from a further radio node.

34. The radio node according to claim 18, wherein the radio node is a device or a network node.

35. A method performed by a radio node for selectively providing synchronization information for Device-to-Device, D2D, communications between devices in a wireless communications network, the method comprising
- receiving, when the radio node is providing synchronization information, an indication to stop providing synchronization information for D2D communications, where the indication to stop providing synchronization information for D2D communications is received from another radio node in the wireless communications network, which indication is a synchronization deactivation request;
- determining whether to continue to provide synchronization information for D2D communications or not based on the received indication;
- responsive to determining to continue providing synchronization information, providing synchronization information for D2D communications; and
- responsive to determining not to continue providing synchronization information, performing at least one of the group consisting of:
  - entering a de-activation stage to stop providing synchronization information for D2D communications;
  - transmitting a second indication to devices receiving synchronization information from the radio node that the radio node is no longer to provide synchronization information for D2D communications; and
  - stopping providing synchronization information for D2D communications.

36. A method performed by a radio node for selectively providing synchronization information for Device-to-Device, D2D, communications between devices in a wireless communications network, the method comprising
- receiving, from another radio node in the wireless communications network, when the radio node is providing synchronization information, an indication to stop providing synchronization information for D2D communications, which indication is a synchronization deactivation request;
- determining whether to continue to provide synchronization information for D2D communications or not based on the received indication;
- responsive to determining to continue providing synchronization information, providing synchronization information for D2D communications; and
- responsive to determining not to continue providing synchronization information, performing at least one of the group consisting of:
  - entering a de-activation stage to stop providing synchronization information for D2D communications;
  - transmitting a second indication to devices receiving synchronization information from the radio node that the radio node is no longer to provide synchronization information for D2D communications, where the second indication is transmitted as part of a discovery information transmission; and
  - stopping providing synchronization information for D2D communications.

* * * * *